US012776493B2

(12) United States Patent
Sugimori et al.

(10) Patent No.: US 12,776,493 B2
(45) Date of Patent: Oct. 27, 2026

(54) CARBON NANOTUBE DISPERSION LIQUID FOR ELECTRODE SLURRY, NEGATIVE ELECTRODE SLURRY, NONAQUEOUS ELECTROLYTE SECONDARY BATTERY, AND MANUFACTURING METHOD FOR CARBON NANOTUBE DISPERSION LIQUID FOR ELECTRODE SLURRY

(71) Applicant: Panasonic Intellectual Property Management Co., Ltd., Kadoma (JP)

(72) Inventors: Masanori Sugimori, Osaka (JP); Yusuke Fukumoto, Osaka (JP); Yuji Yokoyama, Hyogo (JP); Nobuhiro Hirano, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 658 days.

(21) Appl. No.: 18/267,234

(22) PCT Filed: Dec. 6, 2021

(86) PCT No.: PCT/JP2021/044718
§ 371 (c)(1),
(2) Date: Jun. 14, 2023

(87) PCT Pub. No.: WO2022/138108
PCT Pub. Date: Jun. 30, 2022

(65) Prior Publication Data

US 2024/0105958 A1 Mar. 28, 2024

(30) Foreign Application Priority Data

Dec. 23, 2020 (JP) ................................ 2020-213460

(51) Int. Cl.
*H01M 4/62* (2006.01)
*B82Y 30/00* (2011.01)
(Continued)

(52) U.S. Cl.
CPC ............ *H01M 4/625* (2013.01); *B82Y 30/00* (2013.01); *H01M 4/1393* (2013.01);
(Continued)

(58) Field of Classification Search
CPC ........... H01M 4/13; H01M 4/03; H01M 4/05; H01M 10/0525; H01M 4/625; H01M 4/1393
See application file for complete search history.

(56) References Cited

U.S. PATENT DOCUMENTS 12,374,693 B2 * 7/2025 Fukumoto ............ C01B 32/174
2013/0344396 A1 * 12/2013 Bosnyak ............... H01G 9/035
252/62.2

(Continued)

FOREIGN PATENT DOCUMENTS

CN 104603980 A 5/2015
EP 2865031 B1 8/2016

(Continued)

OTHER PUBLICATIONS

International Search Report dated Jan. 18, 2022, issued in counterpart International Application No. PCT/JP2021/044718, with English translation. (5 pages).

(Continued)

*Primary Examiner* — Galen H Hauth
*Assistant Examiner* — Sean R. Brown
(74) *Attorney, Agent, or Firm* — WHDA, LLP

(57) ABSTRACT

Provided is a carbon nanotube dispersion liquid for an electrode slurry such that it is possible to inhibit a decrease in a charge-discharge cycle characteristic. A carbon nano-
(Continued)

tube dispersion liquid for an electrode slurry according to one aspect of the present disclosure includes carbon nanotubes having a diameter of 0.4 to 2 nm, a dispersant, and a dispersion medium. In a Raman spectroscopy spectrum, the carbon nanotubes have a G/D ratio, which is the ratio of the peak intensities of the G-band (1560 to 1600 $cm^{-1}$) and the D-band (1310 to 1350 $cm^{-1}$), within the range of 50 to 200, and in a volume-based particle size distribution via a laser diffraction method, the carbon nanotubes have 3 to 5 peaks, and if the peaks are, from the small particle diameter side, $P_1$, $P_2$, . . . , $P_n$, the greatest frequency peak is in the range pf $P_2$ to $P_{n-1}$.

11 Claims, 3 Drawing Sheets

(51) Int. Cl.

| | |
|---|---|
| ***H01M 4/02*** | (2006.01) |
| ***H01M 4/1393*** | (2010.01) |
| ***H01M 4/38*** | (2006.01) |
| ***H01M 10/0525*** | (2010.01) |

(52) U.S. Cl.

CPC ....... *H01M 4/386* (2013.01); *H01M 10/0525* (2013.01); *H01M 2004/027* (2013.01)

(56) References Cited

U.S. PATENT DOCUMENTS

| | | | | |
|---|---|---|---|---|
| 2018/0261884 | A1 | 9/2018 | Bosnyak et al. | |
| 2019/0172604 | A1 | 6/2019 | Hashimoto et al. | |
| 2020/0083542 | A1 * | 3/2020 | Yushin ................ | H01M 4/8828 |
| 2021/0047185 | A1 | 2/2021 | Finlayson et al. | |
| 2022/0376262 | A1 | 11/2022 | Morita et al. | |

FOREIGN PATENT DOCUMENTS

| | | | |
|---|---|---|---|
| JP | 2011-076948 | A | 4/2011 |
| JP | 2019-189495 | A | 10/2019 |
| JP | 2020-011873 | A | 1/2020 |
| JP | 6801806 | B1 | 12/2020 |
| WO | 2017/199884 | A1 | 11/2017 |
| WO | 2019/226902 | A1 | 11/2019 |

OTHER PUBLICATIONS

Written Opinion dated Jan. 18, 2022, issued in counterpart International Application No. PCT/JP2021/044718. (3 pages).

Extended (Supplementary) European Search Report dated Jan. 23, 2025, issued in counterpart EP Application No. 21910258.9. (9 pages).

Hearing Notice dated Nov. 12, 2025, issued in counterpart IN Application No. 202347039986. (3 pages).

Office Action dated Mar. 28, 2026, issued in counterpart CN Application No. 202180084535.X, with English translation. (13 pages).

* cited by examiner

CARBON NANOTUBE DISPERSION LIQUID FOR ELECTRODE SLURRY, NEGATIVE ELECTRODE SLURRY, NONAQUEOUS ELECTROLYTE SECONDARY BATTERY, AND MANUFACTURING METHOD FOR CARBON NANOTUBE DISPERSION LIQUID FOR ELECTRODE SLURRY

CROSS-REFERENCE TO RELATED APPLICATIONS

This application is a National Phase Application filed under 35 U.S.C. § 371 of International Application No. PCT/JP2021/044718 filed on Dec. 6, 2021, which claims the benefit of priorities under 35 U.S.C. § 119 (a) of Japanese Patent Application No. 2020-213460 filed in Japan on Dec. 23, 2020, the contents of which are incorporated herein by reference.

TECHNICAL FIELD

The present disclosure relates to a carbon nanotube dispersion liquid for an electrode slurry, a negative electrode slurry, a non-aqueous electrolyte secondary battery, and a method for manufacturing a carbon nanotube dispersion liquid for an electrode slurry.

BACKGROUND

Carbon nanotubes have attracted attention as a conductive agent included in an electrode of a non-aqueous electrolyte secondary battery. Carbon nanotubes can greatly improve the conductivity at a smaller content than a conventional conductive agent such as acetylene black. However, carbon nanotubes are likely to aggregate, and therefore have a problem of dispersibility.

Patent Literature 1 discloses a carbon nanotube dispersion liquid for an electrode slurry, and the carbon nanotube dispersion liquid for an electrode slurry includes carbon nanotubes having a G/D ratio, which indicates the crystallinity, greater than or equal to 0.5 and less than or equal to 5, and having a half peak width greater than or equal to 2° and less than or equal to 6°, in powder X-ray diffraction, and includes a vinyl alcohol skeleton-containing resin. Patent Literature 1 describes that an electrode film (electrode mixture layer) produced using this carbon nanotube dispersion liquid for an electrode slurry is excellent in conductivity and adhesion.

CITATION LIST

Patent Literature

Patent Literature 1: JP 2020-11873 A

SUMMARY

Technical Problem

The carbon nanotube dispersion liquid for an electrode slurry described in Patent Literature 1 includes carbon nanotubes having a low G/D ratio, and the frequency distribution is not considered. Thus, there is still room for improvement in charge-discharge cycle characteristics.

Solution to Problem

A carbon nanotube dispersion liquid for an electrode slurry as an aspect of the present disclosure includes carbon nanotubes having a diameter greater than or equal to 0.4 and less than or equal to 2 nm, a dispersant, and a dispersion medium, and the carbon nanotubes have a G/D ratio, which is a ratio of a peak intensity of a G-band (greater than or equal to 1560 and less than or equal to 1600 $cm^{-1}$) to a peak intensity of a D-band (greater than or equal to 1310 and less than or equal to 1350 $cm^{-1}$) in a Raman spectrum, in a range of greater than or equal to 50 and less than or equal to 200, and have 3 to 5 peaks in a volume-based particle size distribution obtained by a laser diffraction method, and when the peaks are represented by $P_1, P_2, \ldots, P_n$ from a small particle size side, one of $P_2$ to $P_{n-1}$ is a maximum peak.

A negative electrode slurry as an embodiment of the present disclosure includes the above-described carbon nanotube dispersion liquid for an electrode slurry, a carbon-based negative electrode active material, and a Si-containing negative electrode active material.

A non-aqueous electrolyte secondary battery as an embodiment of the present disclosure includes a negative electrode produced using the above-described negative electrode slurry.

A method for manufacturing a carbon nanotube dispersion liquid for an electrode slurry, as an embodiment of the present disclosure, includes a mixing step of mixing carbon nanotubes having a diameter greater than or equal to 0.4 and less than or equal to 2 nm, and a G/D ratio, which is a ratio of a peak intensity of a G-band (greater than or equal to 1560 and less than or equal to 1600 $cm^{-1}$) to a peak intensity of a D-band (greater than or equal to 1310 and less than or equal to 1350 $cm^{-1}$) in a Raman spectrum, in a range of greater than or equal to 50 and less than or equal to 200, a dispersant, and a dispersion medium to produce a liquid mixture and a dispersing step of dispersing the carbon nanotubes in the liquid mixture so that in the liquid mixture, the carbon nanotubes have 3 to 5 peaks in a volume-based particle size distribution obtained by a laser diffraction method and when the peaks are represented by $P_1, P_2, \ldots, P_n$ from a small particle size side, one of $P_2$ to $P_{n-1}$ is a maximum peak.

Advantageous Effects of Invention

By using the carbon nanotube dispersion liquid for an electrode slurry according to the present disclosure, deterioration of a charge-discharge cycle characteristic of a battery can be suppressed.

DESCRIPTION OF EMBODIMENTS

Figure 1:
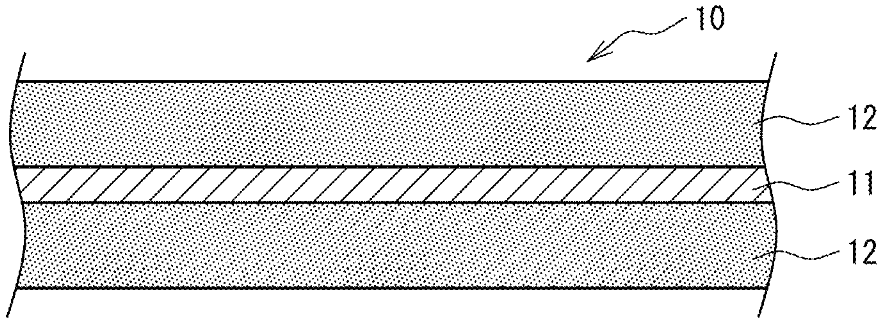
FIG. 1 is a sectional view of an electrode produced using an electrode slurry including a carbon nanotube dispersion liquid for an electrode slurry as an example of an embodiment.

As a result of intensive studies, the present inventors have found that deterioration of the capacity maintenance rate of a battery can be suppressed by using a carbon nanotube dispersion liquid for an electrode slurry in which carbon nanotubes having a G/D ratio greater than or equal to 50 and less than or equal to 200, and a diameter greater than or equal to 0.4 and less than or equal to 2 nm, are dispersed into a predetermined particle size distribution. It is presumed that by forming a mixture layer using the carbon nanotube dispersion liquid for an electrode slurry, active materials in the mixture layer are electrically connected to each other via the carbon nanotubes as a conductive agent and thus deterioration of a charge-discharge cycle characteristic of a battery is suppressed. Carbon nanotubes are fibrous and can suppress isolation of active materials caused by charge and discharge more than a particulate conductive agent, and thus can improve a charge-discharge cycle characteristic. In particular, carbon nanotubes having good crystallinity such that the G/D ratio is as relatively high as greater than or equal to 50 and less than or equal to 200 have good conductivity. By achieving a predetermined particle distribution of such carbon nanotubes while maintaining the good fibrous state, isolation of active materials can be suppressed.

Hereinafter, embodiments of the carbon nanotube dispersion liquid for an electrode slurry, the negative electrode slurry including the carbon nanotube dispersion liquid for an electrode slurry, the non-aqueous electrolyte secondary battery including a negative electrode produced using the negative electrode slurry, and the method for manufacturing a carbon nanotube dispersion liquid for an electrode slurry according to the present disclosure will be described in detail. The embodiments described below are merely examples, and the present disclosure is not limited to the following embodiments. The drawings referred to in the description of embodiments are schematically shown, and the dimensional ratios and the like of the components drawn in the drawings are to be understood in consideration of the following description.

[Non-Aqueous Electrolyte Secondary Battery]

The non-aqueous electrolyte secondary battery according to the present disclosure is, for example, a lithium ion secondary battery. The battery case of the non-aqueous electrolyte secondary battery may include a metal having a shape such as a circular, square, or coin shape, or may include a laminate sheet including a metal layer and a resin layer. The non-aqueous electrolyte secondary battery includes, for example, an electrode assembly and a non-aqueous electrolyte in the battery case. The electrode assembly may be a wound electrode assembly in which a positive electrode and a negative electrode are wound with a separator interposed therebetween, or may be a stacked electrode assembly in which a plurality of positive electrodes and a plurality of negative electrodes are alternately stacked one by one with a separator interposed therebetween. The non-aqueous electrolyte includes a non-aqueous solvent and an electrolyte salt dissolved in the non-aqueous solvent. As the non-aqueous solvent, for example, esters, ethers, nitriles, amides, and mixed solvents of greater than or equal to two thereof can be used. The non-aqueous solvent may contain a halogen-substituted product in which at least a part of hydrogen in a solvent described above is substituted with a halogen atom such as fluorine. As the electrolyte salt, for example, a lithium salt such as $LiPF_6$ is used.

FIG. 1 is a sectional view of an electrode produced using an electrode slurry including a carbon nanotube dispersion liquid for an electrode slurry as an example of an embodiment. An electrode 10 includes a core 11 and an electrode mixture layer 12 layered on a surface of the core 11. As shown in FIG. 1, the electrode 10 may include the electrode mixture layers 12 on both surfaces of the core 11. The electrode 10 may be a long electrode included in a wound electrode assembly or may be a rectangular electrode included in a stacked electrode assembly. The electrode 10 can be applied to a positive electrode, a negative electrode, or both of a positive electrode and a negative electrode of a non-aqueous electrolyte secondary battery. The non-aqueous electrolyte secondary battery preferably includes a negative electrode produced using a negative electrode slurry including the carbon nanotube dispersion liquid for an electrode slurry described below. Hereinafter, the negative electrode produced using a negative electrode slurry including the carbon nanotube dispersion liquid for an electrode slurry will be described as an example, but a positive electrode may be produced using a positive electrode slurry including the carbon nanotube dispersion liquid for an electrode slurry.

As the core 11, a metal foil, a film in which a metal layer is formed on a surface, or the like can be used. The core 11 has a thickness, for example, greater than or equal to 5 and less than or equal to 20 μm. In a positive electrode, a metal foil containing aluminum as a main component can be used as the core 11. In a negative electrode, a metal foil containing copper as a main component can be used. In the present description, the term "main component" means a component contained at the highest mass ratio. The core 11 may be an aluminum foil including substantially 100% of aluminum or a copper foil including substantially 100% of copper.

The electrode mixture layer 12 includes, for example, an active material, carbon nanotubes (CNTs), a carboxymethyl cellulose (CMC), a binder, and the like. The electrode mixture layer 12 have a thickness, for example, greater than or equal to 30 and less than or equal to 200 μm, and preferably greater than or equal to 50 and less than or equal to 150 μm. The electrode mixture layer 12 may include a carbon material, as a conductive agent other than the carbon nanotubes, such as carbon black (CB), acetylene black (AB), or Ketjenblack.

Examples of the active material of a positive electrode (positive electrode active material) included in the electrode mixture layer 12 include lithium-transition metal composite oxides. Examples of the metal element included in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, or Mn is preferably included. Examples of the active material of a negative electrode (negative electrode active material) included in the electrode mixture layer 12 include carbon-based active materials such as natural graphite such as flake graphite, massive graphite, and amorphous graphite and artificial graphite such as massive artificial graphite (MAG) and graphitized mesophase-carbon microbead (MCMB), and Si-based active materials that can form an alloy with lithium. Examples of the Si-based active materials include Si-containing compounds represented by $SiO_x$ ($0.5 \le x \le 1.6$) (hereinafter, referred to as SiO) and Si-containing compounds represented by $Li_{2y}SiO_{(2+y)}$ ($0 \le y \le 2$) in which Si fine particles are dispersed in a lithium silicate phase (hereinafter, referred to as LSX). The active material is a main component of the electrode mixture layer 12, and the content of the active material in the electrode mixture layer 12 is preferably greater than or equal to 85 and less than or equal to 99 mass % and more preferably greater than or equal to 90 and less than or equal to 99 mass %.

Examples of the carbon nanotubes (CNTs) included in the electrode mixture layer 12 include single-walled carbon nanotubes (SWCNTs) and multi-walled carbon nanotubes (MWCNTs). The CNTs included in the negative electrode mixture layer are preferably SWCNTs, and MWCNTs may be included. The CNTs included in the positive electrode mixture layer are preferably CNTs synthesized with a catalyst containing Co, and among such CNTs, MWCNTs are preferable. The positive electrode mixture layer may include SWCNTs.

The SWCNTs have a diameter greater than or equal to 0.4 and less than or equal to 2 nm. The SWCNTs have a length greater than or equal to 0.1 and less than or equal to 200 μm. Here, the diameter of the SWCNTs is determined by measuring the thicknesses of 10 CNTs using a transmission electron microscope (TEM) and calculating the average of the thicknesses. Here, the length of the SWCNTs is determined by measuring the lengths of 10 CNTs using a scanning electron microscope (SEM) and calculating the average of the lengths.

The SWCNTs have a G/D ratio, which is a ratio of the peak intensity of a G-band (greater than or equal to 1560 and less than or equal to 1600 $cm^{-1}$) to the peak intensity of a D-band (greater than or equal to 1310 and less than or equal to 1350 $cm^{-1}$) in a Raman spectrum, in a range of greater than or equal to 50 and less than or equal to 200. SWCNTs having a high G/D ratio have high crystallinity. As a Raman spectrometer, for example, NRS-5500 manufactured by JASCO Corporation can be used.

The carboxymethyl cellulose (CMC) included in the electrode mixture layer 12 functions as a viscosity-modifying thickener in the electrode slurry as described below. The CMC may also function as a binder. Examples of the CMC include carboxymethyl cellulose sodium salt and carboxymethyl cellulose ammonium salt.

Examples of the binder, other than the CMC, included in the electrode mixture layer 12 include fluororesins such as polytetrafluoroethylene (PTFE) and polyvinylidene fluoride (PVdF), polyacrylonitrile (PAN), polyimides, acrylic resins, polyolefins, and styrene butadiene rubber (SBR) and its modified products. The positive electrode mixture layer may include, for example, PVdF, and the negative electrode mixture layer may include, for example, SBR or its modified product.

The electrode 10 can be produced by, for example, applying an electrode slurry including an active material, CNTs, a CMC, a binder, and the like to the core 11, drying the applied slurry to form an electrode mixture layer 12, and then rolling the electrode mixture layer 12.

The negative electrode slurry preferably includes the carbon nanotube dispersion liquid for an electrode slurry described below, a carbon-based negative electrode active material, and a Si-based negative electrode active material. The negative electrode slurry may further include SBR or its modified product.

Next, a carbon nanotube dispersion liquid for an electrode slurry as an example of an embodiment will be described.

[Carbon Nanotube Dispersion Liquid for Electrode Slurry]

The carbon nanotube dispersion liquid for an electrode slurry includes single-walled carbon nanotubes (SWCNTs), a dispersant, and a dispersion medium. As described below, the carbon nanotube dispersion liquid for an electrode slurry includes SWCNTs having a predetermined property and a predetermined particle size distribution, and a dispersant. Thus, the active materials in the mixture layer are electrically connected to each other via the SWCNTs as a conductive agent, and deterioration of a charge-discharge cycle characteristic of a battery is suppressed. The dispersion medium is, for example, water such as ion-exchanged water or distilled water.

The SWCNTs have a diameter greater than or equal to 0.4 and less than or equal to 2 nm and a G/D ratio in the range of 50 to 200. The SWCNTs have 3 to 5 peaks in a volume-based particle size distribution obtained by a laser diffraction method, and when the peaks are represented by $P_1, P_2, \ldots P_n$ from the small particle size side, the maximum peak is in the range of $P_2$ to $P_{n-1}$. The particle size distribution indicates a dispersion state of the SWCNTs. As the particle size distribution measuring device, for example, MT3000II manufactured by MicrotracBEL Corp. can be used.

Figure 2:
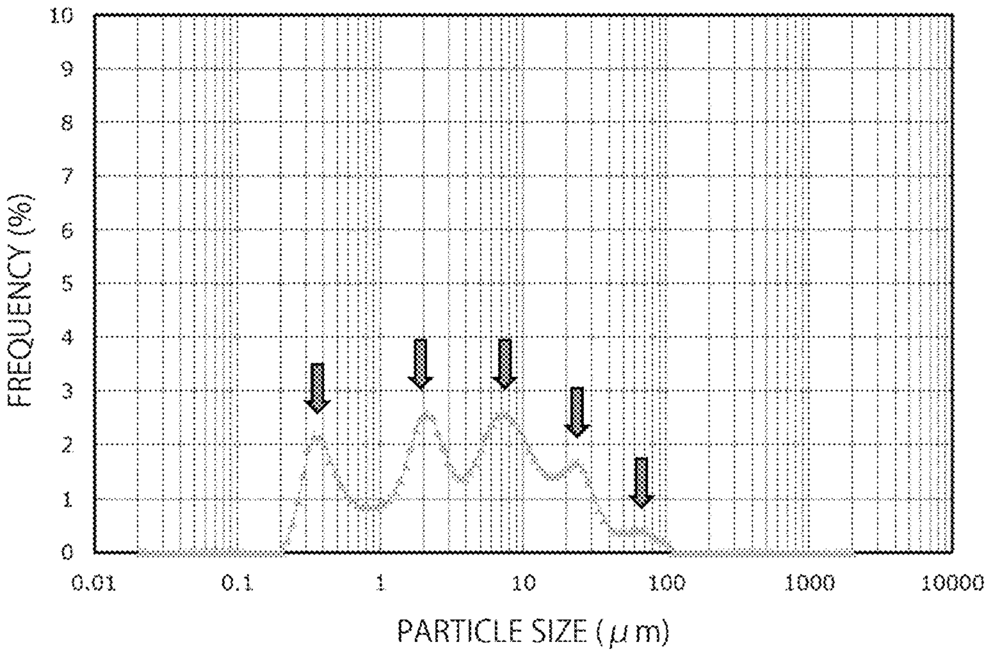
FIG. 2 is a graph showing a particle size distribution of single-walled carbon nanotubes in a carbon nanotube dispersion liquid for an electrode slurry as an example of an embodiment.
Figure 3A:
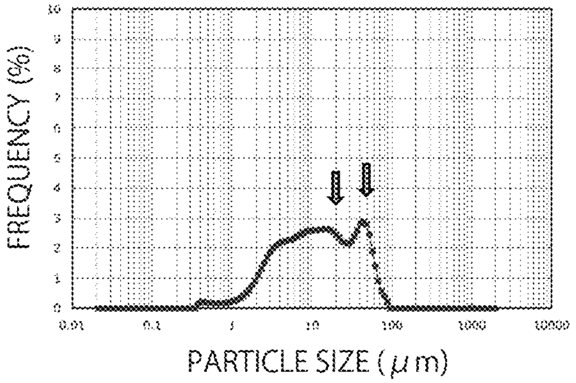
FIG. 3(*a*) to FIG. 3(*d*) show graphs showing a change in a particle size distribution of single-walled carbon nanotubes (SWCNTs) in a liquid mixture in a dispersing step of a method for manufacturing a carbon nanotube dispersion liquid for an electrode slurry as an example of an embodiment in a case where the treatment time is longer in order of FIG. 3(*a*) to FIG. 3(*d*).
Figure 3B:
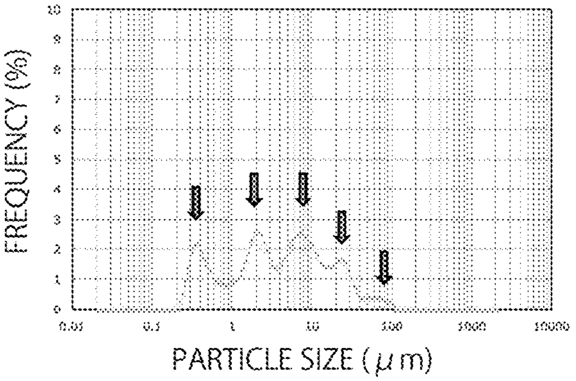
Figure 3C:
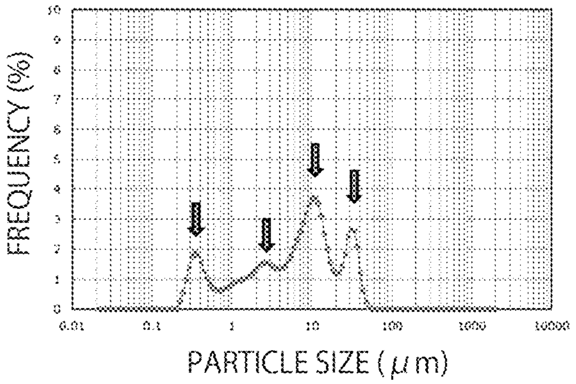
Figure 3D:
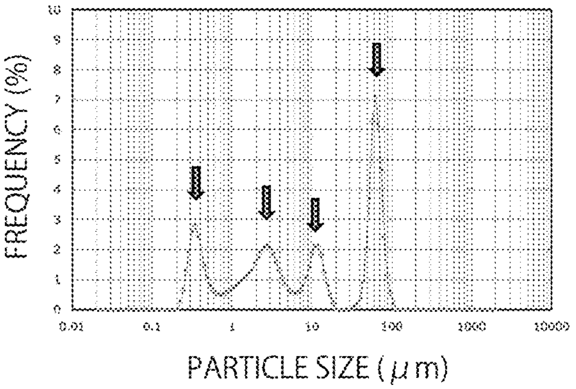

The particle size distribution and the state of the SWCNTs in the carbon nanotube dispersion liquid for an electrode slurry will be described with reference to FIG. 2. FIG. 2 is a graph showing a particle size distribution of SWCNTs in a carbon nanotube dispersion liquid for an electrode slurry as an example of an embodiment. In the frequency distribution of FIG. 2, the SWCNTs have 5 peaks, and the second peak from the left is the maximum peak. Therefore, in this case, the predetermined condition is satisfied that the SWCNTs have 3 to 5 peaks and when the peaks are represented by $P_1, P_2, \ldots P_n$ from the small particle size side, the maximum peak is in the range of $P_2$ to $P_{n-1}$, that is, the maximum peak is at neither of the ends of the peak range. When the number of peaks is greater than or equal to 3, it is indicated that the directions are non-uniform in which the SWCNTs having a large aspect ratio are irradiated with a laser beam emitted from the particle size distribution measuring device, and that the SWCNTs maintain a fibrous shape. The upper limit of the number of peaks is usually 5 in a preferred dispersion state. When the maximum peak is in the range of $P_2$ to $P_{n-1}$, it is indicated that the fibrous SWCNTs are well dispersed. When the maximum peak is at the left end, this fact means that the SWCNTs are progressively cut to generate many fragments. When the maximum peak is at the right end, this fact means that the dispersion is insufficient or that the dispersion is excessive and the particles are re-aggregated. As described above, when the maximum peak is outside the range of $P_2$ to $P_{n-1}$, the SWCNTs are not in a good state, and thus isolation of the active materials cannot be suppressed.

The content of the SWCNTs in the carbon nanotube dispersion liquid for an electrode slurry is preferably greater than or equal to 0.1 and less than or equal to 1.5 mass %, more preferably greater than or equal to 0.2 and less than or equal to 1.0 mass %, and particularly preferably greater than or equal to 0.3 and less than or equal to 0.5 mass %.

The content of the dispersant in the carbon nanotube dispersion liquid for an electrode slurry is preferably greater than or equal to 50 and less than or equal to 250 parts by mass, more preferably greater than or equal to 100 and less than or equal to 200 parts by mass, and particularly preferably greater than or equal to 120 and less than or equal to 180 parts by mass with respect to 100 parts by mass of the SWCNTs.

Examples of the dispersant include carboxymethyl celluloses (CMCs), polyvinylpyrrolidone (PVP), and surfactants, and the surfactants mainly include anionic, cationic, nonionic, and amphoteric surfactants. The dispersant is preferably a CMC.

For example, the viscosity of a 3% aqueous solution of the CMC at 100 $s^{-1}$ is greater than or equal to 2 and less than or equal to 200 mPa·s. The viscosity at 100 $s^{-1}$ can be determined by dissolving the CMC in water to produce a 3% aqueous solution and measuring this aqueous solution at 25° C. from 0.1 to 1000 $s^{-1}$ using a rheometer. As the rheometer, for example, MCR 102 manufactured by Anton Paar GmbH can be used. The viscosity of the carbon nanotube dispersion liquid for an electrode slurry described below can be measured in the same manner.

The viscosity of the carbon nanotube dispersion liquid for an electrode slurry at 100 $s^{-1}$ is greater than or equal to 50 and less than or equal to 200 mPa·s, preferably greater than or equal to 60 and less than or equal to 180 mPa·s, and more preferably greater than or equal to 70 and less than or equal to 150 mPa·s in a state where the SWCNTs are dispersed.

[Method for Manufacturing Carbon Nanotube Dispersion Liquid for Electrode Slurry]

The method includes a mixing step of mixing SWCNTs having a diameter greater than or equal to 0.4 and less than or equal to 2 nm and a G/D ratio in the range of 50 to 200, a dispersant, and a dispersion medium to produce a liquid mixture and a dispersing step of dispersing the SWCNTs in the liquid mixture so that the SWCNTs in the liquid mixture have 3 to 5 peaks in a volume-based particle size distribution obtained by a laser diffraction method and when the peaks are represented by $P_1, P_2, \ldots P_n$ from the small particle size side, the maximum peak is in the range of $P_2$ to $P_{n-1}$. The SWCNTs mixed in the mixing step have a length, for example, greater than or equal to 0.1 and less than or equal to 200 μm.

In the mixing step, for example, an in-line mixer or the like is used to produce a liquid mixture while the dispersant is adsorbed to the SWCNTs. The adsorption of the dispersant to the SWCNTs can suppress re-aggregation of the SWCNTs. As the in-line mixer, for example, magic LAB manufactured by IKA can be used.

Examples of the device used in the dispersing step include high-pressure homogenizers, bead mills, and ultrasonic dispersing devices. These devices can loosen and disperse the SWCNTs contained in the liquid mixture. High-pressure homogenizers can loosen and disperse the SWCNTs more efficiently than bead mills and ultrasonic dispersing devices, and therefore the device used in the dispersing step is preferably a high-pressure homogenizer. As the high-pressure homogenizer, a valve type or nozzle type high-pressure homogenizer can be used, and a nozzle and valve combination type high-pressure homogenizer can also be used. As the nozzle type high-pressure homogenizer, for example, BERYU MINI manufactured by Beryu corp. can be used. In the high-pressure homogenizer, the dispersion state of the SWCNTs can be changed by adjusting the flow rate, the pressure, the nozzle diameter, and the like.

The treatment time of the mixing step and the dispersion state of the SWCNTs will be described with reference to FIG. 3(*a*) to FIG. 3(*d*). FIG. 3(*a*) to FIG. 3(*d*) show graphs showing a change in a particle size distribution of SWCNTs in a liquid mixture in a dispersing step of a method for manufacturing a carbon nanotube dispersion liquid for an electrode slurry as an example of an embodiment in a case where the treatment time is longer in order of FIG. 3(*a*) to FIG. 3(*d*). The treatment time may be changed according to the specification and the setting condition of a device, but for example, the treatment time can be lengthened by passing the liquid mixture through the device a plurality of times.

FIG. 3(*a*) shows the case of insufficient treatment time, and in this case, the number of peaks is less than three. In this case, it is considered that the dispersion of the SWCNTs in the liquid mixture is insufficient and many SWCNTs are aggregated. In FIG. 3(*a*), a shoulder is observed in the vicinity of a particle size of 3 μm. In the present description, the term "peak" means a point where the frequency is maximum, and therefore this shoulder is not a peak because the frequency in this shoulder is not maximum.

When the liquid mixture in the state of FIG. 3(*a*) is further treated, the particle size distribution of the SWCNTs becomes the state of FIG. 3(*b*), and when the liquid mixture is further treated, the particle size distribution becomes the state of FIG. 3(*c*). In the particle size distribution shown in FIG. 3(*b*), the SWCNTs have 5 peaks, and the maximum peak is the second peak from the left ($P_2$) and is not at neither of the ends. In the particle size distribution shown in FIG. 3(*c*), the SWCNTs have 4 peaks, and the maximum peak is the third peak from the left ($P_3$) and is not at neither of the ends. FIGS. 3(*b*) and 3(*c*) satisfy the predetermined condition, and thus the dispersion state of the SWCNTs is good.

When the liquid mixture in the state of FIG. 3(*c*) is further treated, the particle size distribution of the SWCNTs becomes the state of FIG. 3(*d*). In the particle size distribution shown in FIG. 3(*d*), the SWCNTs have 4 peaks, and the maximum peak is at the right end. In this case, it is considered that the SWCNTs are excessively dispersed and re-aggregated.

EXAMPLES

Hereinafter, the present disclosure will be further described with reference to Examples, but the present disclosure is not limited to these Examples.

Example 1

[Production of Carbon Nanotube Dispersion Liquid for Electrode Slurry]

Single-walled carbon nanotubes (SWCNTs) having a diameter of 1.6 nm, an average length of 15 μm, and a G/D ratio of 95 were used. The SWCNTs, a carboxymethyl cellulose (CMC) whose 3% aqueous solution had a viscosity of 6.7 mPa·s at 100 $s^{-1}$, and water were mixed at a mass ratio of 0.4:0.4:99.2 using an in-line mixer (magic LAB manufactured by IKA) to produce a liquid mixture (mixing step). The liquid mixture was treated 10 times at a flow rate of 0.24 L/min under a pressure of 100 Pa using a nozzle type high-pressure homogenizer (BERYU MINI manufactured by Beryu corp.) with a diamond nozzle having a nozzle diameter of 0.18 mm to produce a carbon nanotube dispersion liquid for an electrode slurry (dispersing step). In a volume-based particle size distribution obtained by a laser diffraction method, the single-walled carbon nanotubes in the carbon nanotube dispersion liquid for an electrode slurry had 4 peaks, and the maximum peak was the second peak from the left ($P_2$).

[Production of Negative Electrode Slurry]

A mixture of graphite, SiO, and LSX at a mass ratio of 95:3:2 was used as a negative electrode active material. The Negative electrode active material, the carbon nanotube dispersion liquid for an electrode slurry, a CMC, lithium polyacrylate, and styrene butadiene rubber (SBR) were mixed so that the mass ratio thereof was 100:0.02:1:1:0.4 in terms of solid content to prepare a negative electrode slurry.

[Production of Negative Electrode]

The negative electrode slurry was applied to both surfaces of a negative electrode core made of a copper foil with a die coating method, and the applied film was dried, then rolled with a roller, and cut into a predetermined electrode size to produce a negative electrode. In the negative electrode, a negative electrode core-exposed portion for connection of a negative electrode lead was provided at one end in the width direction.

[Production of Positive Electrode]

An NCA (Ni—Al—Co)-based lithium-transition metal composite oxide containing 88 mass % of Ni was used as a positive electrode active material. A carbon nanotube dispersion liquid for a positive electrode slurry containing multi-walled carbon nanotubes (MWCNTs), polyvinylpyrrolidone (PVP), and N-methyl-2-pyrrolidone (NMP) was prepared. Into NMP, the positive electrode active material, the carbon nanotube dispersion liquid for a positive electrode slurry, and polyvinylidene fluoride (PVdF) were mixed so that the mass ratio thereof was 100:0.4:0.8 in terms of solid content to prepare a positive electrode slurry. Next, the positive electrode slurry was applied to both surfaces of a positive electrode core made of an aluminum foil with a die coating method, and the applied film was dried, then rolled with a roller, and cut into a predetermined electrode size to produce a positive electrode. In the positive electrode, a positive electrode core-exposed portion for connection of a positive electrode lead was provided at one end in the width direction.

[Preparation of Non-Aqueous Electrolyte]

Ethylene carbonate (EC), ethylmethyl carbonate (EMC), and dimethyl carbonate (DMC) were mixed at a volume ratio of 3:3:4. In the resulting mixed solvent, lithium hexafluorophosphate ($LiPF_6$) was dissolved so that the concentration of $LiPF_6$ was 1.2 mol/L, and thus a non-aqueous electrolyte was prepared.

[Production of Test Cell]

A positive electrode lead was attached to the exposed portion of the positive electrode, a negative electrode lead was attached to the exposed portion of the negative electrode, the positive electrode and the negative electrode were spirally wound with a separator made of polyolefin interposed therebetween, and then the resulting product was press-molded in the radial direction to produce a flat wound electrode assembly. The electrode assembly was housed in an exterior housing body formed of an aluminum laminate sheet, the non-aqueous electrolyte was injected, and then an opening of the exterior housing body was sealed to obtain a test cell (battery capacity: 400 mAh).

[Evaluation of Capacity Maintenance Rate]

The test cell was subjected to the following cycle test. The cycle test was performed until the capacity maintenance rate became less than or equal to 85%, and the number of cycles at which the capacity maintenance rate became less than or equal to 85% was regarded as the upper limit cycle number.

<Cycle Test>

The test cell was charged at a constant current of 0.5 C under a temperature environment of 25° C. until the battery voltage reached 4.2 V, charged at a constant voltage of 4.2 V until the current value reached 0.05 C, and then discharged at a constant current of 0.7 C until the battery voltage reached 2.5 V. This procedure was regarded as 1 cycle. The cycle was repeated while a rest for 10 minutes was taken after end of each cycle.

Example 2

A test cell was produced, measured, and evaluated in the same manner as in Example 1 except that the number of times of the treatment was changed to 20 in the dispersing step in production of the carbon nanotube dispersion liquid for an electrode slurry.

Example 3

A test cell was produced, measured, and evaluated in the same manner as in Example 1 except that the number of times of the treatment was changed to 30 in the dispersing step in production of the carbon nanotube dispersion liquid for an electrode slurry.

Example 4

A test cell was produced, measured, and evaluated in the same manner as in Example 1 except that the number of times of the treatment was changed to 40 in the dispersing step in production of the carbon nanotube dispersion liquid for an electrode slurry.

Example 5

A test cell was produced, measured, and evaluated in the same manner as in Example 2 except that the SWCNTs used was changed to SWCNTs having a diameter of 2 nm, an average length of 15 μm, and a G/D ratio of 50 in the mixing step in production of the carbon nanotube dispersion liquid for an electrode slurry.

Comparative Example 1

A test cell was produced, measured, and evaluated in the same manner as in Example 1 except that the number of times of the treatment was changed to 3 in the dispersing step in production of the carbon nanotube dispersion liquid for an electrode slurry.

Comparative Example 2

A test cell was produced, measured, and evaluated in the same manner as in Example 1 except that the number of times of the treatment was changed to 5 in the dispersing step in production of the carbon nanotube dispersion liquid for an electrode slurry.

Comparative Example 3

A test cell was produced, measured, and evaluated in the same manner as in Example 1 except that the number of times of the treatment was changed to 60 in the dispersing step in production of the carbon nanotube dispersion liquid for an electrode slurry.

Comparative Example 4

A test cell was produced, measured, and evaluated in the same manner as in Example 1 except that the number of times of the treatment was changed to 100 in the dispersing step in production of the carbon nanotube dispersion liquid for an electrode slurry.

Comparative Example 5

A test cell was produced, measured, and evaluated in the same manner as in Example 1 except that the nozzle diameter of the nozzle type high-pressure homogenizer used was changed to 0.13 mm in the dispersing step in production of the carbon nanotube dispersion liquid for an electrode slurry.

Comparative Example 6

A test cell was produced, measured, and evaluated in the same manner as in Example 5 except that the number of times of the treatment was changed to 5 in the dispersing step in production of the carbon nanotube dispersion liquid for an electrode slurry.

Comparative Example 7

A test cell was produced, measured, and evaluated in the same manner as in Example 5 except that the number of times of the treatment was changed to 40 in the dispersing step in production of the carbon nanotube dispersion liquid for an electrode slurry.

Table 1 describes the evaluation results of the upper limit cycle number in Examples and Comparative Examples. Table 1 also describes the G/D ratio of the SWCNTs included in the carbon nanotube dispersion liquid for an electrode slurry, the nozzle diameter of and the number of times of the treatment with the nozzle type high-pressure homogenizer used in the dispersing step, the number of peaks obtained from the particle size distribution of the SWCNTs in the carbon nanotube dispersion liquid for an electrode slurry, and the maximum peak position.

TABLE 1

| | | Dispersing device | | Frequency distribution | | Evaluation result |
|---|---|---|---|---|---|---|
| | SWCNT G/D ratio | Nozzle diameter (mm) | Number of times of treatment | Number of peaks N | Maximum peak position | Upper limit cycle number |
| Example 1 | 95 | 0.18 | 10 | 4 | P2 | 241 |
| Example 2 | 95 | 0.18 | 20 | 4 | P3 | 253 |
| Example 3 | 95 | 0.18 | 30 | 5 | P3 | 244 |
| Example 4 | 95 | 0.18 | 40 | 5 | P4 | 240 |
| Example 5 | 50 | 0.18 | 10 | 4 | P2 | 235 |
| Comparative Example 1 | 95 | 0.18 | 3 | 1 | P1 | 225 |
| Comparative Example 2 | 95 | 0.18 | 5 | 2 | P2 | 231 |
| Comparative Example 3 | 95 | 0.18 | 60 | 4 | P4 | 225 |
| Comparative Example 4 | 95 | 0.18 | 100 | 5 | P5 | 221 |
| Comparative Example 5 | 95 | 0.13 | 10 | 5 | P1 | 220 |
| Comparative Example 6 | 50 | 0.18 | 5 | 1 | P1 | 224 |
| Comparative Example 7 | 50 | 0.18 | 40 | 4 | P4 | 218 |

The test cells of Examples 1 to 5 have a negative electrode produced using a carbon nanotube dispersion liquid for an electrode slurry satisfying the predetermined condition. As a result, the test cells of Examples 1 to 5 can suppress deterioration of the charge-discharge cycle characteristic of the battery more than the test cells of Comparative Examples 1 to 7.

REFERENCE SIGNS LIST

10 Electrode
11 Core
12 Electrode mixture layer

The invention claimed is:

1. A carbon nanotube dispersion liquid for an electrode slurry, comprising carbon nanotubes having a diameter greater than or equal to 0.4 and less than or equal to 2 nm;

a dispersant; and a dispersion medium, the carbon nanotubes having a G/D ratio in a range of greater than or equal to 50 and less than or equal to 200 in a Raman spectrum, the G/D ratio as a ratio of a peak intensity of a G-band (greater than or equal to 1560 and less than or equal to 1600 $cm^{-1}$) to a peak intensity of a D-band (greater than or equal to 1310 and less than or equal to 1350 $cm^{-1}$), the carbon nanotubes having 3 to 5 peaks in a volume-based particle size distribution obtained by a laser diffraction method, the peaks represented by $P_1$, $P_2$, . . . , $P_n$ from a small particle size side, wherein one of $P_2$ to $P_{n-1}$ is a maximum peak.

2. The carbon nanotube dispersion liquid for an electrode slurry according to claim 1, including the carbon nanotubes at a content greater than or equal to 0.1 and less than or equal to 1.5 mass %.

3. The carbon nanotube dispersion liquid for an electrode slurry according to claim 1, including the dispersant at a content greater than or equal to 50 and less than or equal to 250 parts by mass with respect to 100 parts by mass of the carbon nanotubes.

4. The carbon nanotube dispersion liquid for an electrode slurry according to claim 1, wherein the dispersant is a carboxymethyl cellulose (CMC).

5. The carbon nanotube dispersion liquid for an electrode slurry according to claim 4, wherein a viscosity of a 3% aqueous solution of the CMC at 100 $s^{-1}$ is greater than or equal to 2 and less than or equal to 200 mPa·s.

6. A negative electrode slurry comprising: the carbon nanotube dispersion liquid for an electrode slurry according to claim 1; a carbon-based negative electrode active material; and a Si-based negative electrode active material.

7. A non-aqueous electrolyte secondary battery comprising a negative electrode produced using the negative electrode slurry according to claim 6.

8. A method for manufacturing a carbon nanotube dispersion liquid for an electrode slurry, the method comprising:

a mixing step of mixing carbon nanotubes having a diameter greater than or equal to 0.4 and less than or equal to 2 nm and a G/D ratio in a range of greater than or equal to 50 and less than or equal to 200 in a Raman spectrum, the G/D ratio as a ratio of a peak intensity of a G-band (greater than or equal to 1560 and less than or equal to 1600 $cm^{-1}$) to a peak intensity of a D-band (greater than or equal to 1310 and less than or equal to 1350 $cm^{-1}$), a dispersant, and a dispersion medium to produce a liquid mixture; and a dispersing step of dispersing the carbon nanotubes in the liquid mixture so that the carbon nanotubes in the liquid mixture have 3 to 5 peaks in a volume-based particle size distribution obtained by a laser diffraction method, the peaks represented by $P_1$, $P_2$, . . . , $P_n$ from a small particle size side, and one of $P_2$ to $P_{n-1}$ is a maximum peak.

9. The carbon nanotube dispersion liquid for an electrode slurry according to claim 1, wherein the dispersant is polyvinylpyrrolidone (PVP).

10. The carbon nanotube dispersion liquid for an electrode slurry according to claim 1, wherein the dispersant is a surfactant.

11. The carbon nanotube dispersion liquid for an electrode slurry according to claim 1, wherein the dispersion medium is an aqueous dispersion medium.

* * * * *